though it to be understood that I do not limit myself to this exact form of seat but may employ any form or construction of seat or spacing device which performs the intended function which is to distribute the balls in the race and to maintain them at a distance substantially equal apart from each other.

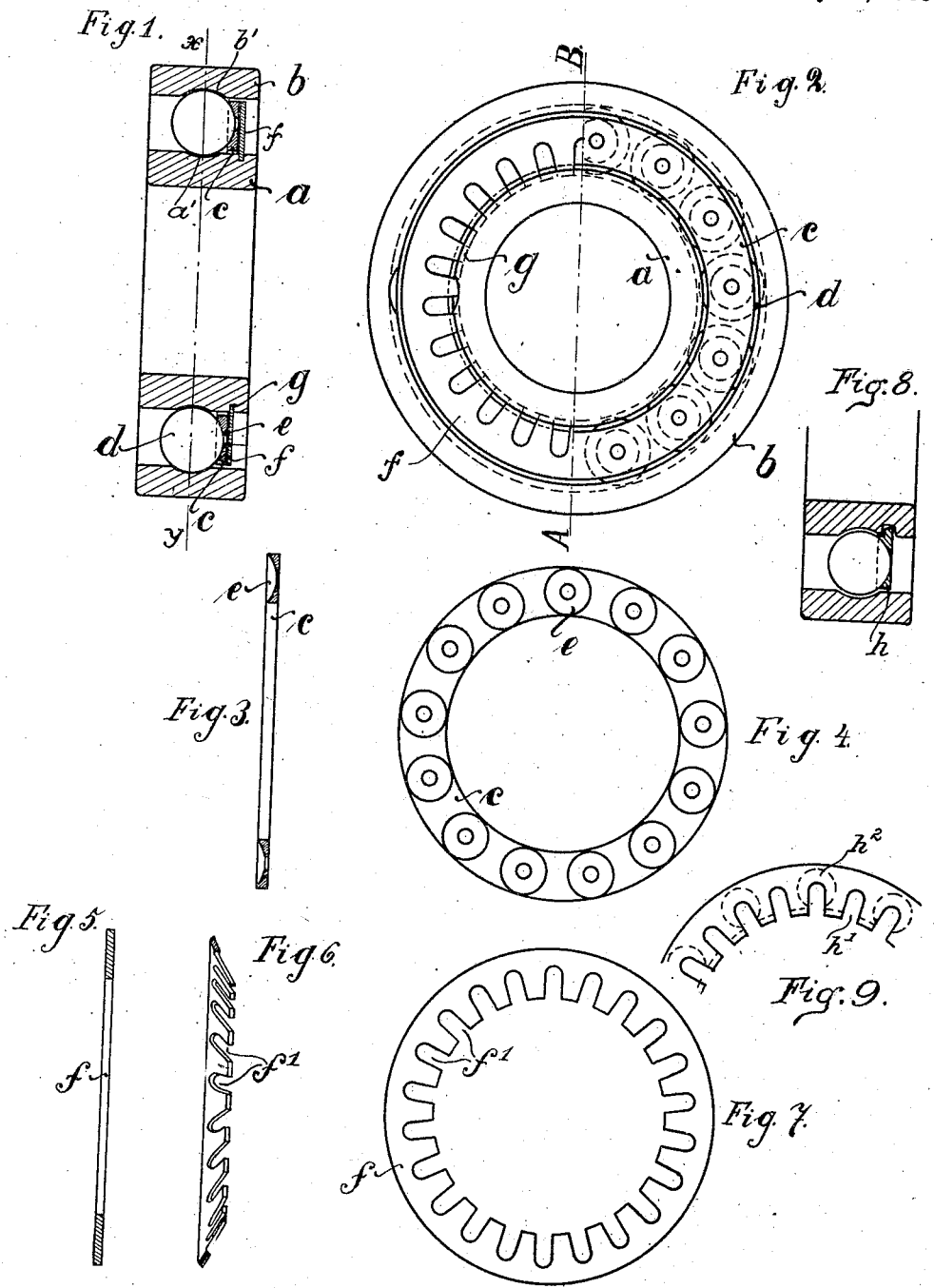

UNITED STATES PATENT OFFICE.

HEINRICH FROBÖSE, OF BIELEFELD, GERMANY.

ANTIFRICTION-BEARING.

No. 928,956.

Specification of Letters Patent.

Patented July 27, 1909.

Application filed February 12, 1908. Serial No. 415,597.

*To all whom it may concern:*

Be it known that I, HEINRICH FROBÖSE, a subject of the Emperor of Germany, residing at Bielefeld, Germany, have invented certain new and useful Improvements in Antifriction-Bearings, of which the following is a specification.

This invention relates to improvements in antifriction bearings and has for one of its objects the provision of such a bearing particularly designed for the employment of spherical elements such as balls, the improved construction being such that said balls are given practically a universal movement thereby insuring uniform wear thereof.

A further improvement consists in an improved form of means for spacing the balls so as to keep the same out of engagement with each other and in the preferred construction the spacing means does not positively engage the balls, or in other words no positive mechanical connection is provided, so that the function of the spacing means is performed by frictional engagement between the same and said balls. Preferably the spacing means is not mechanically connected with the device of the invention and is not positively held in position but is desirably of the floating type and is movable with the balls. Means are provided for frictionally engaging the floating spacing means to hold the same in position and said means is desirably removably secured in place.

The invention will be more fully described in connection with the accompanying drawing and will be more particularly pointed out and ascertained in and by the appended claims.

In the drawing: Figure 1, is a sectional view taken on line A—B of Fig. 2. Fig. 2, is a view in elevation with parts broken away. Fig. 3, is a sectional view of the improved spacing means or ring. Fig. 4, is a side view thereof. Fig. 5, is a sectional view of means for retaining the spacer in position, said figure showing this feature as a blank ring, from which the completed ring is manufactured. Fig. 6, is a sectional view of the ring when complete showing the same dished. Fig. 7, is a side view of said ring. Fig. 8, is a sectional view illustrating a modified construction. Fig. 9, is a detail of one of the parts thereof.

Like characters of reference designate similar parts throughout the different figures of the drawing:

As shown the invention comprises antifriction bearing members $a$ and $b$ which are in the form of rings adapted to be associated with parts of a mechanism to which the bearing is to be applied. Said members are conveniently provided with annular opposed recesses $a'$ and $b'$ which form a ball race although this particular form of race is not essential. An advantage of this form of race is that it affords room for a greater number of balls and therefore affords a greater anti-friction efficiency by distributing the bearing portions upon a greater number of surfaces and preventing the imposition of excessive pressure upon relatively limited surfaces. A further advantage of this form of race is that by distributing the weight or strain upon a relatively large number of balls the same are not subjected to the amount of wear that would be the case with a relatively limited number of balls. A plurality of balls $d$ are disposed or nested in the race and the number of balls employed is so proportioned with respect to the containing capacity of the race as to permit the balls to be located in relatively close proximity with respect to each other and a sufficient distance apart from each other to prevent engagement.

Spacing means is provided for maintaining the balls in close proximity with respect to each other and to prevent engagement there between and in the most preferred embodiment of the invention said means performs its function without being mechanically connected with the balls. In order to prevent interference by the spacer or spacing means with free movement of the balls said means itself is mechanically unconnected or is not positively connected with any part of the device and the same is maintained in a prescribed relation with respect to the balls by means of its engagement therewith which engagement, in the preferred embodiment, is wholly frictional.

Considered in connection with the specific embodiment shown the spacing means consists of a flat ring $s$ which is provided with a plurality of ball engaging portions or seats $c$ which as shown are concaved in a manner to fit the peripheral surface of the balls. Said seats $c$ are for the purpose of spacing the balls apart from each other and therefore the same are disposed and proportioned in accordance with the number of balls used. Said ring $c$ is adapted to be interposed between the anti-friction members $a$ and $b$ in a manner to engage the balls $d$ on a line angular to the line of strain imposed by the members $a$ and $b$. It will be seen that under the action of the members $a$ and $b$ the balls $d$ will revolve about horizontal axes and that by reason of the lateral engagement of the spacer $c$ the balls $d$ will have a tendency to rotate about radial axes. In practice however it has been found that the lateral engagement of the ring $c$ will effect promiscuous rotation of the balls so that the bearing portions thereof will be constantly changed thereby causing uniform wear. This feature is very advantageous in as much as it prevents the balls from becoming worn on definite lines. The ring $c$ is so proportioned that a working clearance is afforded between the same and the members $a$ and $b$ which permits of bodily rotation of the spacer $c$ with the balls $d$. It will be obvious however that the speed with which the ring $c$ rotates will be the same as the bodily rotation of the balls but the axial rotation of the balls will be greater than the speed of the rotation of the ring $c$ and it is partly due to this difference of movement that the balls $d$ are caused to rotate promiscuously in the ball race. It will be further obvious that the ring $c$ is floatingly suspended with respect to the members $a$ and $b$ and that it is held in concentric relation therewith by its engagement with the balls.

Means are provided for holding or retaining said spacing ring in engagement with the balls $d$ and as shown said means consists of a ring $f$ adapted to be held in place by engagement with one of the bearing members preferably $a$. By reference to Fig. 1 it will be seen that the ring $f$ is not mechanically connected with the ring $c$ but serves to hold the same in place by frictional engagement therewith thereby permitting said ring $c$ to freely rotate. As shown said ring $f$ is formed from a flat blank illustrated in section in Fig. 5. Fig. 6 shows the ring dished or conical and the inner margin of said ring is preferably notched as at $f'$ to permit of this dished formation. By dishing the flat blank the inner diameter is enlarged and the outer diameter is reduced. The member $a$ is provided with a retainer holder in the form of an annular groove $g$ in which the inner notched margin of the ring $f$ is adapted to seat. In assembling the parts the spacing ring $c$ is inserted between the members $a$ and $b$ and is engaged with the balls $d$ and thereafter the dished ring $f$ is inserted between the members $a$ and $b$ and flattened against the ring $c$. The enlarged inner diameter of the ring $f$ permits of readily passing the same over the member $a$ and when the former is flattened its inner marginal portion projects into and seats in the groove $g$. The walls of the groove $g$ are parallel and serve effectively to prevent the ring $f$ from unseating itself by reason of the tension caused by the flattening operation and this tension of the ring $f$ is therefore exerted upon the ring $c$ to hold the same in engagement with the balls $d$.

In Figs. 8 and 9 a single ring $h$ is shown in which the spacing and retaining means is embodied in a single structure. Said ring $h$ is notched at $h'$ and is provided with ball seats $h^2$ for engagement with the balls $d$. In other respects the structure of the modified form is similar to that of the preferred form.

It will be understood that the flattening of the ring $f$ does not in any sense constitute a step in the manufacture of the ring as the same is a complete and finished article when in the form shown in Figs. 6 and 7. The flattening of said ring in the groove $g$ is merely a step in the assembling of the parts which is equivalent to the insertion of any yielding member in place.

I claim:—

1. In combination, bearing members providing a ball race, anti-friction balls disposed in said race, spacing means for spacing said balls apart from each other, and a dished or conical retainer of yielding material flattened into engagement with said spacing means to hold the same in operative relation with said balls.

2. In combination, bearing members providing a ball race, anti-friction balls disposed in said race, spacing means for spacing said balls apart from each other, and a dished or conical retainer of yielding material provided with a notched marginal portion flattened into engagement with said retaining means to hold the same in operative relation with said balls.

3. In combination, bearing members providing a ball race, one of said members being provided with a retainer groove, balls disposed in said race, spacing means for spacing said balls apart from each other, and a dished or conical retainer of yielding material flattened into engagement with said spacing means thereby forcing one portion of said retainer into said groove whereby said retainer is held in place.

In testimony whereof I affix my signature in presence of two witnesses.

HEINRICH FROBÖSE.

Witnesses:
 ROBERT V. BULOW,
 M. BEHNE.